US012364218B2

(12) United States Patent
T M

(10) Patent No.: US 12,364,218 B2
(45) Date of Patent: Jul. 22, 2025

(54) METHOD AND A SYSTEM FOR REGULATING A FLOW OF WATER

(71) Applicant: FARMS2FORK TECHNOLOGIES PVT LTD, Karnataka (IN)

(72) Inventor: Mallesh T M, Karnataka (IN)

(73) Assignee: FARMS2FORK TECHNOLOGIES PVT LTD, Kamataka (IN)

(*) Notice: Subject to any disclaimer, the term of this patent is extended or adjusted under 35 U.S.C. 154(b) by 114 days.

(21) Appl. No.: 18/284,593

(22) PCT Filed: Mar. 28, 2022

(86) PCT No.: PCT/IN2022/050312
§ 371 (c)(1),
(2) Date: Sep. 28, 2023

(87) PCT Pub. No.: WO2022/208543
PCT Pub. Date: Oct. 6, 2022

(65) Prior Publication Data

US 2024/0172611 A1 May 30, 2024

(30) Foreign Application Priority Data

Mar. 31, 2021 (IN) ............................ 202141014737

(51) Int. Cl.
*A01G 25/16* (2006.01)

(52) U.S. Cl.
CPC ............ *A01G 25/167* (2013.01); *A01G 25/16* (2013.01)

(58) Field of Classification Search
CPC .............................. A01G 25/167; A01G 25/16
USPC .............................. 137/78.3, 487.5; 340/540
See application file for complete search history.

(56) References Cited

U.S. PATENT DOCUMENTS 8,660,705 B2 * 2/2014 Woytowitz ........... A01G 25/167 239/63
9,032,998 B2 * 5/2015 O'Brien ................. G05B 15/02 239/69
10,499,573 B1 * 12/2019 Paulsen ................ A01C 21/007
10,728,336 B2 * 7/2020 Akhtar ................. G06Q 10/087
(Continued)

FOREIGN PATENT DOCUMENTS

CN 102550373 A 7/2012

OTHER PUBLICATIONS

Kempegowda, Balakrishna, "Real-Time Soil Monitoring System for the Application of Agriculture" DOI 10.4010/2016.1304 Jan. 31, 2016 (Jan. 31, 2016) (pp. 5327 & 5329, table No. 1 & 2).

*Primary Examiner* — Minh Q Le
(74) *Attorney, Agent, or Firm* — SOROKER AGMON NORDMAN RIBA

(57) ABSTRACT

The present embodiment provides a method (100) and a system (200) of notifying a user for regulating a flow of water. The method (100) involves the following steps: sensing a moisture level and a water level of a soil: comparing the moisture level and the water level with a standard value and determining the amount of water required by a grown crop: texting the user of the amount of water and monitoring the action taken by the user: sensing the moisture level and the water level of the soil and calling the user when the flow of water is not regulated: escalating and notifying a field manager when the call is not answered and taking a feedback from the user for the problem.

10 Claims, 2 Drawing Sheets

100

START — 102
Sensing a moisture level and a water level of a soil — 104
Processing a deficiency of water required by a grown crop — 106
Texting the user of the deficiency of water required by the crop — 108
Yes / Action Taken / No
Calling the user of the deficiency of water required by the crop — 110
Yes / Action Taken / No
Escalating and notifying a field manager — 112
END — 114

(56) References Cited

U.S. PATENT DOCUMENTS

| | | | | |
|---|---|---|---|---|
| 2014/0035752 | A1* | 2/2014 | Johnson | A01B 79/005<br>340/601 |
| 2015/0009030 | A1* | 1/2015 | Shih | A01G 7/00<br>340/540 |
| 2016/0033437 | A1* | 2/2016 | Anjum | G05B 15/02<br>324/664 |
| 2016/0255763 | A1* | 9/2016 | Canyon | A01B 79/005 |
| 2022/0312699 | A1* | 10/2022 | Pandit | A01G 25/167 |
| 2022/0346331 | A1* | 11/2022 | Yan | A01G 25/167 |
| 2023/0337606 | A1* | 10/2023 | Borhani | A01G 27/003 |
| 2023/0397551 | A1* | 12/2023 | Charling | A01G 25/16 |
| 2024/0053282 | A1* | 2/2024 | Kobayashi | A01G 25/167 |
| 2024/0172608 | A1* | 5/2024 | Larsen | A01G 25/165 |
| 2024/0172609 | A1* | 5/2024 | Larsen | A01G 25/165 |
| 2024/0172610 | A1* | 5/2024 | K A | G01N 33/246 |

* cited by examiner

METHOD AND A SYSTEM FOR REGULATING A FLOW OF WATER

FIELD OF INVENTION

The present embodiment relates to a field of agriculture and farming, and more particularly relates to a system and a method of controlling/regulating a flow of water in a farm.

BACKGROUND OF INVENTION

This section is intended only to provide background information pertaining to the similar field of the present invention, and may be used only to enhance the understanding of the present invention and not as admissions of prior art.

In general, agricultural needs are always in high demand and supply across the globe, and throughout the year. Several advancements have been done in agricultural and farming techniques to enhance the production. However, the demand and supply ratio is still a challenge for the farming and agricultural governing bodies.

Generally, in agriculture, irrigation is the most important factor for the crop production. A different variety of crops require a different amount of water. For example, paddy crops such as rice require a flooded area and the millets require less water for the growth and production of the crop.

Traditionally, crops were grown based on the knowledge of the farmers. The farmers manually maintain the flow of water in a field/farm by physically examining the level of water. This method has been in existence from long time however has a few disadvantages vis-à-vis increased risk of delay and errors by the farmer in determining the water level. This may also lead to crop destruction due to excessive water or scarcity of water, as different crops have different water requirements.

Recently, a variety of methods have been identified for controlling the irrigation in the agriculture field. The variety of method includes installation of sensors on the field and then notifying the farmer of the water level. The method involves sending a notification/alert to the farmer but there is no mechanism for monitoring whether the farmer has received and read the alert and has taken the necessary action. There exists no method that can address the issues/feedback of the farmer in an end-to-end basis.

Therefore, there is a need of a system and a method that can overcome the shortcomings of the existing methods. There is a need of the system and the method that monitors the farmer's action and thus help in providing better productivity of the crops.

SUMMARY OF INVENTION

In an aspect, a real-time method of notifying a user for regulating a flow of water is provided. The method includes the following steps: 1) Sensing a moisture level and a water level of a soil. 2) Comparing the moisture level and the water level with a standard value and determining the amount of water required by a grown crop. The standard value is the optimum water required by the grown crop. 3) Texting the user of the amount of water required by the grown crop and monitoring the action taken by the user. 4) Sensing the moisture level and the water level of the soil and calling the user when the flow of water is not regulated by the farmer. 5) Escalating and notifying a field manager when the call is not answered and taking a feedback from the user for the problem.

In another aspect, an IoT enabled system of notifying a user for regulating a flow of water is provided. The system includes a sensing unit, a processing unit and a notifying unit. The sensing unit is configured to determine a moisture level and a water level of a soil. The sensing unit is installed in a farm. The processing unit is configured to compare the moisture level and the water level with a standard value and processes/determines an amount of water required by a grown crop. The notifying unit is configured to notify the user of the water required by the grown crop. The notifying unit sends a text message to the user and monitors an action of the user. The sensing unit senses the moisture level and the water level of the soil in real-time and triggers the notifying unit when the flow of water is not regulated. The notifying unit then sends a call three times to the user. The notifying unit escalates and notifies a field manager when the call is not answered and takes a feedback from the user for the problem. The IoT enabled system provides an end-to-end solution so that no alert/notification is missed by the user.

The preceding is a simplified summary to provide an understanding of some aspects of embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

To facilitate understanding, like reference numerals have been used, where possible, to designate like elements common to the figures.

DETAILED DESCRIPTION

As used throughout this application, the word "may" is used in a permissive sense (i.e., meaning having the potential to), rather than the mandatory sense (i.e., meaning must). Similarly, the words "include", "including", and "includes" mean including but not limited to.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

Figure 1:
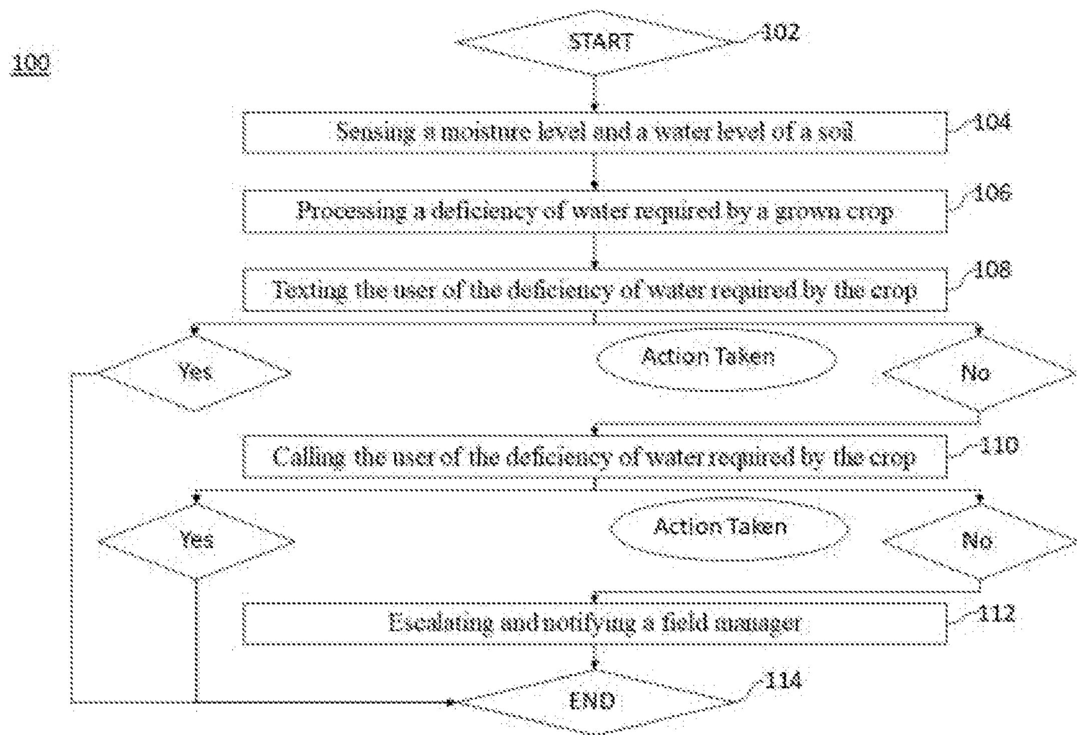
FIG. 1 illustrates a method (100) of notifying a user for regulating a flow of water, according to an embodiment herein.

FIG. 1 illustrates the real-time method (100) of notifying the user for regulating the flow of water. The method (100) provides an end-to-end solution for notifying the user. The method (100) provides the notifications to the user in real-time. The method (100) helps in making sure that the notification/alert is not missed by the user. In an embodiment, the user is a farmer. In another embodiment, the user is a person that grows the crop in a field. The method (100) includes the following steps:

At step 104, a moisture level and a water level of a field is measured. In an embodiment, the moisture level is measured below the ground level. In an embodiment, the water level is measured above the ground level.

Figure 2:
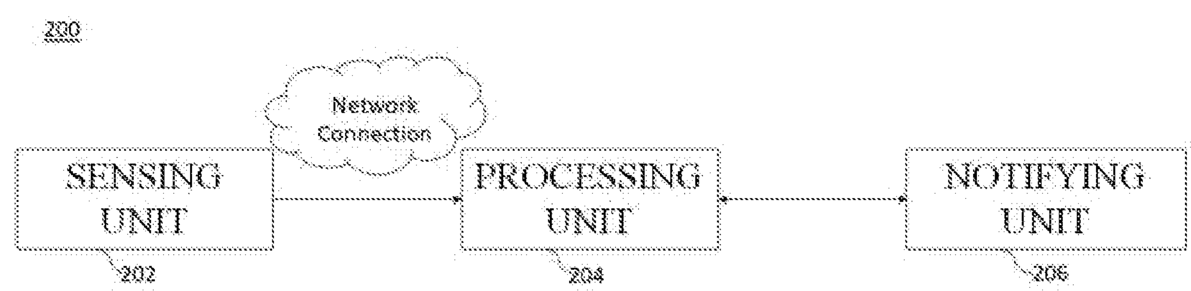
FIG. 2 illustrates an IoT enabled system (200) of notifying the user for regulating the flow of water, according to an embodiment herein.

In an embodiment, the moisture level and the water level are measured by a sensing unit (mentioned in FIG. 2). In an embodiment, the moisture level and the water level are measured by measuring the resistivity of the soil.

In an embodiment, the moisture level and the water level are measured depending on the crop type. For example, the water level above the ground level is measured for the paddy crops. The paddy crops require flooding of the field for the optimum growth. A technique such as alternate wetting and drying (AWD) involves the alternate wetting and drying periods. The information about the water level above the ground level is sent further for the processing.

In an embodiment, the moisture level is measured at different depths depending on the water requirement of a variety of crops. For example, crops such as sugarcane require more water for the growth. The moisture level is measured at depths up to 30 cm below the ground level. Another example is that the leguminous crops such as peas and beans and other crops such as cabbage and cauliflower require less water for the growth. The water level is measured at depths up to 10 cm below the ground level.

At step 106, the information related to the moisture level and the water level is compared with a standard value of the grown crop. The standard value is the amount of water required for the optimum growth of the crop. The standard value of the variety of crops is stored/pre-fed in the system (200).

In an embodiment, when the moisture level and the water level is less than the standard value, a notification/alert is sent to the user. For example, crop such as sugarcane requires 1800 to 2200 mm of water at regular intervals for the optimum growth. When the moisture level of soil is less than the water requirement of the sugarcane, the notification/alert for switching on the irrigation/water supply is sent to the user. In another embodiment, when the moisture level and the water level is more than the standard value, notification/alert for switching off the irrigation/water supply is sent to the user.

At step 108, the notification/alert in a form of text message is sent to the user. In an embodiment, the text message notifies the user about the amount of water in the field in real-time. In an embodiment, when the amount of water/moisture is less than the standard value, the text message notifies/informs the user to switch on the irrigation/water supply. In another embodiment, when the amount of water/moisture is more than the standard value, the text message notifies/informs the user to switch off the irrigation/water supply.

In an embodiment, an action of the user is monitored. In an embodiment, the water level and the moisture level is monitored in real-time and determines whether the irrigation/water control has been switched on/off after the text message. In an embodiment, the present method helps in making sure that the notification/alert is not missed by the user.

In an embodiment, when the irrigation/water control is switched on/off after the text message, the method (100) jumps to the step 114 and the process is stopped. In another embodiment, when the irrigation/water control is not switched on/off after the text message within a time duration of 3-4 hours, the method (100) moves to the next step.

At step 110, the notification/alert in a form of phone call is sent to the user. In an embodiment, the phone call notifies/informs the user about the amount of water in the field in real-time. In an embodiment, when the amount of water/moisture is less than the standard value, the phone call notifies/informs the user to switch on the irrigation/water supply. In another embodiment, when the amount of water/moisture is more than the standard value, the phone call notifies/informs the user to switch off the irrigation/water supply.

In an embodiment, the phone call is sent to the user when the user fails to switch on/off the irrigation/water supply after the text message. In an embodiment, the phone call is made three times to the user. In an embodiment, the present method (100) helps in making sure that the notification/alert is not missed by the user.

In an embodiment, when the call is answered by the user, the method jumps to the step 114 and the process is stopped. In another embodiment, when the user fails to answer the call, the method moves to the next step.

At step 112, the notification/alert is sent to a field manager. In an embodiment, the field manager is a person who operates/manages the multiple fields. In an embodiment, the field manager informs the user and the process in stopped. In an embodiment, the method takes the feedback about the problem/issues faced by the user. In an embodiment, the feedback includes the reasons for unavailability in responding to the notifications/alerts. The present method allows the farmer for the better production of crops and helps in preventing the crop destruction due to excess water or deficiency of water.

FIG. 2 illustrates the IoT enabled system (200) of notifying the user for regulating the flow of water. The IoT enabled system (200) provides an end-to-end solution for notifying the user. The IoT enabled system (200) provides the notifications to the user in real-time. The IoT enabled system (200) helps in making sure that the notification/alert is not missed by the user. The IoT enabled system (200) includes the sensing unit (202), a processing unit (204) and a notifying unit (206).

The sensing unit (202) is capable of sensing the moisture level and the water level of the field. The moisture level is measured below the ground level and the water level is measured above the ground level.

In an embodiment, the sensing unit (202) is a device such as, but not limited to, a drone and a hybrid sensor for sensing the moisture level and the water level of the field. In an embodiment, the sensing unit (202) is based on the principle of resistivity and capacitance for measuring the moisture level and the water level. In a preferred embodiment, the sensing unit (202) is based on the principle of resistivity for measuring the moisture level and the water level. The sensing unit (202) determines/senses the moisture level and the water level and sends the information to the processing unit (204) through a network connection.

The processing unit (204) compares the information related to the moisture level and the water level with the standard value and determines the amount of water required in the field. In an embodiment, the standard value is a threshold/optimum amount of water required by the grown crop. The standard value is pre-set/pre-fed in the system (200).

In an embodiment, when the moisture level and the water level is less than the standard value, the processing unit triggers the notifying unit to send the alert/notification to switch on the irrigation/water supply. In another embodiment, when the moisture level and the water level is more than the standard value, the processing unit triggers the notifying unit to sends the alert/notification to switch off the irrigation/water supply.

The notifying unit (206) receives the information from the processing unit (204) and sends the alert/notification to the user. In an embodiment, the notifying unit (206) sends a text message to the user. In an embodiment, the notifying unit (206) notifies the user about the amount of water in real-time. In an embodiment, when the amount of water is less than the standard value, the notifying unit (206) sends a text message to the user to switch on the irrigation/water supply. In another embodiment, when the amount of water is more than the standard value, the notifying unit (206) sends a text message to the user to switch off the irrigation/water supply.

In an embodiment, the action of the user is monitored. In an embodiment, the sensing unit (202) monitors whether the irrigation/water supply has been switched on/off after the text message. In an embodiment, the sensing unit (202) determines the level of water in real-time.

In an embodiment, when the irrigation/water supply is not switched on/off after the text message within a time frame of 3-4 hours, the notifying unit (206) sends the phone call to the user.

In an embodiment, the phone call notifies/informs the user about the amount of water in real-time. In an embodiment, when the amount of water is less than the standard value, the phone call notifies/informs the user to switch on the irrigation/water supply. In another embodiment, when the amount of water is less than the standard value, the phone call notifies/informs the user to switch off the irrigation/water supply. In an embodiment, the phone call is made three times to the user.

In an embodiment, when the user fails to answer the call, the notifying unit (206) sends a notification/alert to the field manager. In an embodiment, the field manager informs the user and the process in stopped. In an embodiment, the system (200) takes the feedback from the user about the problem/issues faced. In an embodiment, the feedback includes the reasons for unavailability in responding to the notifications/alerts.

In an embodiment, the paddy crops require alternate wetting and drying phases. The monitoring of the flow of water helps in decreasing the decay of carbon and thereby reduces the release of methane and carbon dioxide.

The present method (100) and system (200) allow the farmer for the better production of crops and helps in preventing the crop destruction due to excess water or deficiency of water. The present method (100) and system (200) helps in saving water by monitoring/regulating the flow of water. The regulation of the flow of water helps in increasing the yield and quality improvement of the crops.

The foregoing discussion of the present invention has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

I claim:

1. A real-time method (100) of notifying a user for regulating a flow of water, the method (100) comprising:

sensing a moisture level and a water level of a soil;

comparing the moisture level and the water level with a standard value and determining the amount of water required by a grown crop;

texting the user of the amount of water required by the grown crop and monitoring the action taken by the user;

sensing the moisture level and the water level of the soil and calling the user when the flow of water is not regulated; and escalating and notifying a field manager when the call is not answered and taking a feedback from the user for the problem.

2. The real-time method (100) as claimed in claim 1 further comprises regulating the flow of water by the user depending on the moisture level and the water level.

3. The real-time method (100) as claimed in claim 1, wherein the user is a farmer.

4. The real-time method (100) as claimed in claim 1, wherein the moisture level is measured below the ground level.

5. The real-time method (100) as claimed in claim 1, wherein the water level is measured above the ground level.

6. The real-time method (100) as claimed in claim 1, wherein the standard value is the optimum amount of water required by the grown crop.

7. The real-time method (100) as claimed in claim 1, wherein the call is made three times to the user.

8. An IoT enabled system (200) of notifying a user for regulating a flow of water, the system (200) comprises:

a sensing unit (202) configured to determine a moisture level and a water level of a soil, wherein the sensing unit (202) is installed in a farm;

a processing unit (204) configured to compare the moisture level and the water level with a standard value, wherein the processing unit (204) processes/determines an amount of water required by a grown crop;

a notifying unit (206) configured to notify the user of the water required by the grown crop, wherein the notifying unit (206):

sends a text message to the user and monitors an action of the user;

sends a call to the user when the flow of water is not regulated, wherein the notifying unit (206) sends the call three times to the user; and escalates and notifies a field manager when the call is not answered and takes a feedback from the user for the problem.

9. The IoT enabled system (200) as claimed in claim 8, wherein the sensing unit (202) is connected to the processing unit (204) through a network connection.

10. The IoT enabled system (200) as claimed in claim 8, wherein the standard value is pre-fed in the system.

* * * * *